J. C. PRICE.
TIRE GRINDING AND TRUING MACHINE.
APPLICATION FILED MAY 3, 1916.

1,218,459.

Patented Mar. 6, 1917.
2 SHEETS—SHEET 1.

Witnesses

Inventor
J. C. Price
By David P. Moore
Attorney

J. C. PRICE.
TIRE GRINDING AND TRUING MACHINE.
APPLICATION FILED MAY 3, 1916.
1,218,459.
Patented Mar. 6, 1917.
2 SHEETS—SHEET 2.
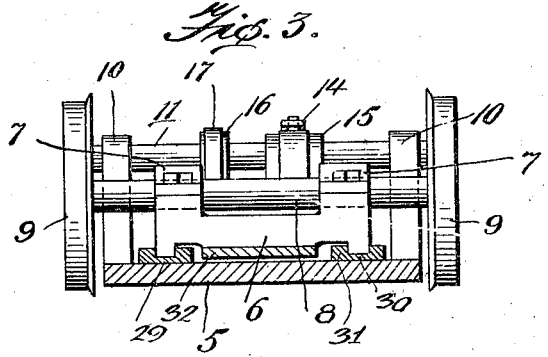
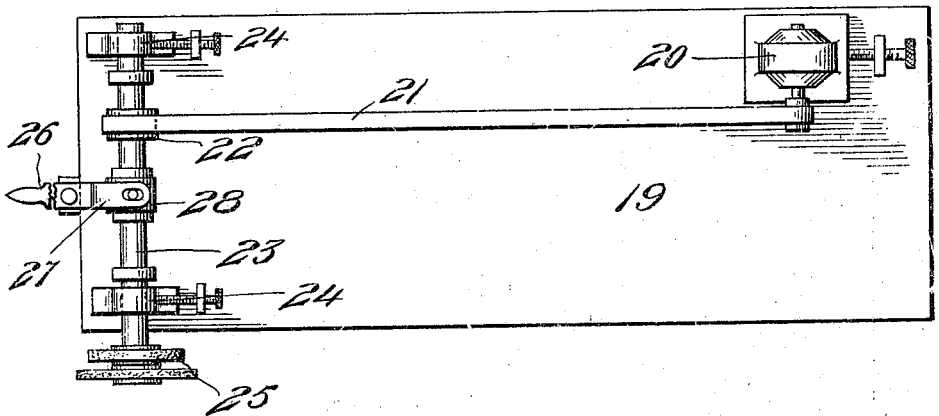

UNITED STATES PATENT OFFICE.

JOHN C. PRICE, OF WEVACO, WEST VIRGINIA.

TIRE GRINDING AND TRUING MACHINE.

1,218,459.  Specification of Letters Patent.  Patented Mar. 6, 1917.

Application filed May , 1916. Serial No. 95,243.

*To all whom it may concern:*

Be it known that I, JOHN C. PRICE, a citizen of the United States, residing at Wevaco, in the county of Kanawha and State of West Virginia, have invented certain new and useful Improvements in Tire Grinding and Truing Machines, of which the following is a specification.

This invention relates to improvements in tire grinding and truing machines, one object of the invention being the provision of means for grinding and truing the tires and treads of car wheels, and whereby a single wheel or two wheels may be ground and trued simultaneously.

A further object of the present invention is the provision of a machine of this character, which is simple, durable and inexpensive to manufacture and operate, and which is thoroughly efficient and practical in use.

In the accompanying drawings:—

Fig. 3 is a detail view thereof.

Fig. 4 is a top plan view of a modified form of the machine.

Figure 1:
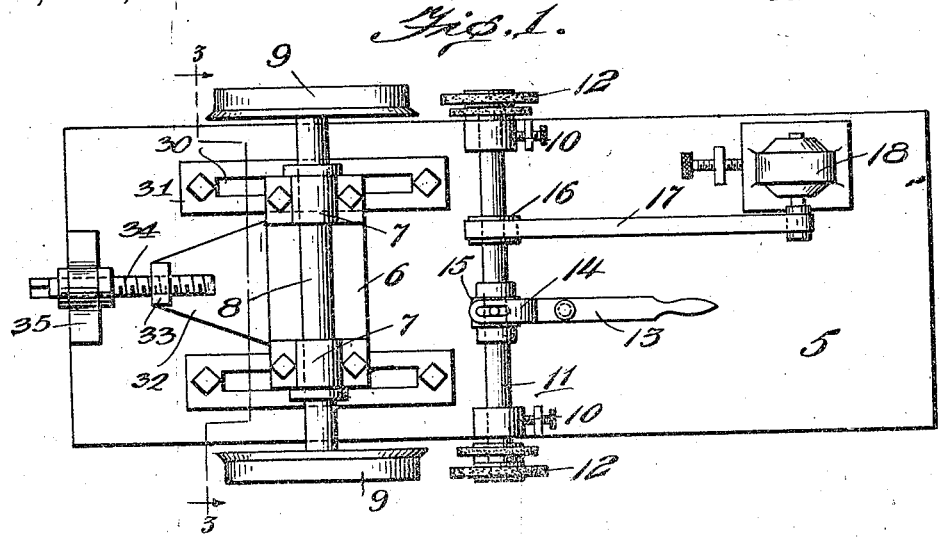
Figure 1 is a top plan view of one form of machine.
Figure 2:
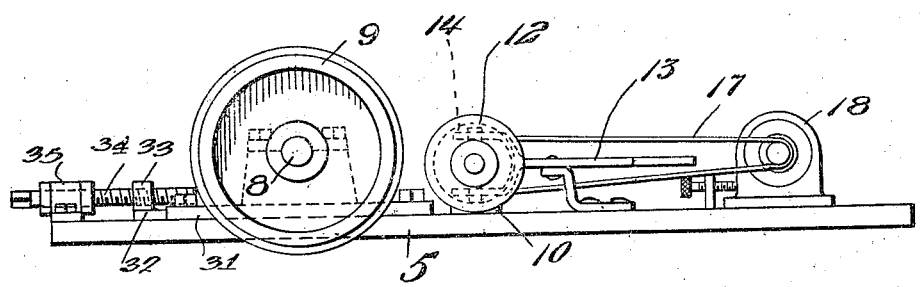
Fig. 2 is a side elevation thereof.

Referring to the drawings, and more particularly to Figs. 1, 2 and 3, the numeral 5 designates the platform.

Mounted upon the platform are the integrally formed and spaced standards 6 carrying the bearings 7 for the shaft 8, upon which can be removably mounted the journal for the car wheels 9, to be ground and trued.

Also mounted upon the platform are the two bearing standards 10, in which is rotatably and slidably mounted the shaft 11, which carries removably upon its outer ends the abrading wheels 12. These wheels are preferably made of emery, carborundum, or a like material, and by reason of the fact that the shaft carrying them can be both rotated and moved longitudinally, the peripheries of the wheels 12 may be moved transversely of the treads or rims of the wheels 9, to thus grind and true the complete treads.
A hand lever 13 is mounted upon the platform, and is connected by the slotted yoke 14 to the pins on the collar 15 on the shaft 11, so that the operator can slide the shaft 11, and thus direct the movement of the wheels 12. A pulley 16 is fast to the shaft 11, so that the belt 17, connected to the electric motor or other prime mover 18, may be operated to rotate the shaft 11 and the abrading wheels.

Where found desirable, the platform may be moved under the car truck which has been previously jacked up, the wheels to be ground and trued not being removed, but the abrading wheels are moved to proper relation thereto. This feature is especially desirable with mine cars, as this operation can be carried out without placing the car out of commission.

In the construction shown in Fig. 4, the platform 19, carries the motor or prime mover 20, which by means of the belt 21 operates through the pulley 22, the shaft 23. This shaft is mounted for rotation and also longitudinal movement in the bearing boxes 24, and carries upon one end the abrading wheel 25, or where desired two may be employed one at each end. In this instance, the shifting lever 26 is mounted at the front end of the platform, and is connected through the yoke 27 and collar 28 to the shaft 23.

Instead of the belt connections, where found desirable, sprockets and chains, or gears may be employed, and also where the electric motors are shown, it is evident that gas engines or any other power means may be employed.

The construction of apparatus shown in Fig. 4 is more particularly adapted for use upon the wheels of motor mine cars, or where it is not desirable or practicable to remove the wheels. Again referring to Figs. 1 to 3 of the drawings, the standard 6 has formed on its bottom face guide ribs 29 which engage in channels 30 formed in guide plates 31 bolted or otherwise fastened to the platform 5 in spaced parallel relation to each other longitudinally thereof so that the standard 6 can be moved a limited distance upon the platform. Formed on the standard 6 at one side thereof is an extension 32, in the eye 33 of which is threaded an adjusting screw 34, the same being swiveled in a bearing or lug 35 at one end of the platform 5, and upon adjustment of this screw 34 said standard can be moved upon the guide plates 31 for the positioning of the car wheels 9 carried upon the axle 8 journaled in the bearings 7 upon said standard relative to the grinding mechanism, as will be clearly obvious.

It is possible with this machine to cut the tread and flange of car wheels simultaneously. To do this, four abrading wheels will be used on shaft 11 instead of two, as shown, while on shaft 23 there will be two wheels 25 of varying sizes to engage the tread and flange simultaneously.

What I claim, as new, is:—

1. In a machine of the character described a supporting platform, channeled guide plates rigidly mounted longitudinally of the platform and in spaced parallel relation with each other, integrally formed spaced standards, ribs on the under surfaces of the standards for sliding engagement with the channeled guide plates, separable bearings on the upper surfaces of the standards for detachably receiving the journal for car wheels, an extension projecting from the standards and positioned between the guide plates, an eye on the outer end of the extension, an adjusting screw bar mounted in the eye, a lug carried by the platform and having the opposite end of the bar mounted therein whereby when the bar is adjusted the standards will be correspondingly adjusted, and abrading mechanism supported upon the platform and having abrading means for engagement with the treads and flanges of car wheels.

2. In a machine of the character described, a supporting platform, spaced stationary bearing standards carried by the platform, a shaft mounted for rotary and sliding movement in the bearing standards, abrading wheels carried by the projecting ends of the shaft, a collar carried by the shaft, pins projecting from the collar, a prime mover mounted on the platform and operatively connected to the shaft for rotating the shaft, a bracket carried by the platform, a hand lever pivoted to the bracket for horizontal swinging movement, and a slotted yoke formed on the inner end of the lever and engaged about the pins so as to move the shaft laterally of the platform when the lever is actuated.

In testimony whereof I affix my signature.

JOHN C. PRICE.

Copies of this patent may be obtained for five cents each, by addressing the "Commissioner of Patents, Washington, D. C."